Jan. 31, 1928.
E. S. BOYER
1,657,523
BATTERY BOX OR THE LIKE AND DETACHABLE HANDLES THEREFOR
Filed Feb. 25, 1926
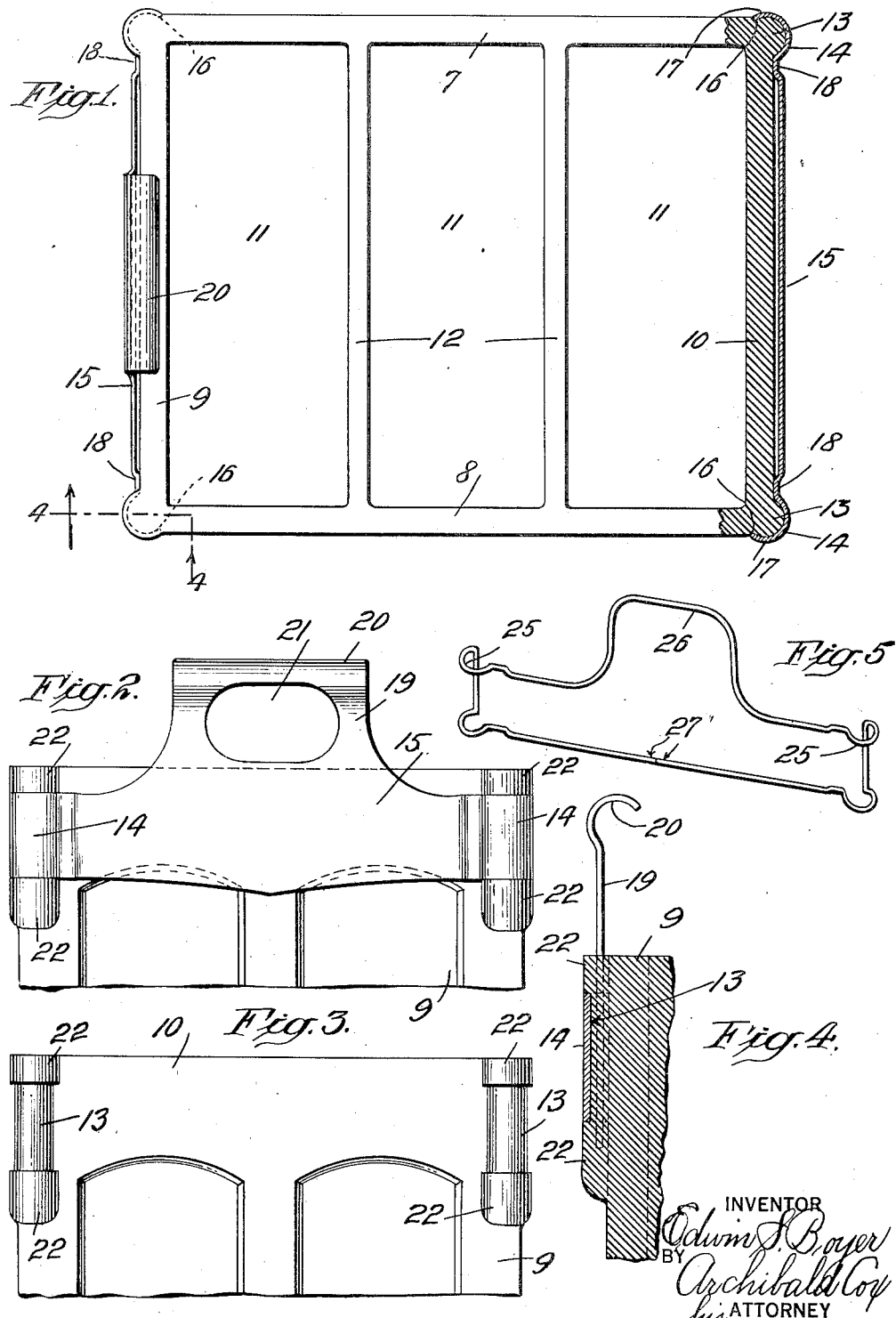

Patented Jan. 31, 1928.

1,657,523

UNITED STATES PATENT OFFICE.

EDWIN S. BOYER, OF PLAINFIELD, NEW JERSEY, ASSIGNOR TO AMERICAN HARD RUBBER COMPANY, OF NEW YORK, N. Y., A CORPORATION OF NEW YORK.

BATTERY BOX OR THE LIKE AND DETACHABLE HANDLES THEREFOR.

Application filed February 25, 1926. Serial No. 90,480.

The invention relates to an improvement in battery boxes and the like and detachable handles therefor.

Boxes or containers for wet batteries used in automobile service or for like purposes are at the present time commonly composed of hard rubber or rubber containing compounds. Although these hard rubber boxes or containers are particularly suitable for holding wet batteries, considerable difficulty has been experienced in handling them, that is, placing them in and removing them from the automobile or other position of service. Permanently attached metal handles have proven unsatisfactory because they become corroded by the acid and break off. Handles formed on the sides of the box and integral therewith have not proven successful because the rubber compound becomes softened while the battery is in operation and when the box is lifted by these handles it becomes distorted, thereby causing the cement which seals the covers over the batteries to crack and allowing the acid to leak out. Where the boxes are unprovided with handles the workman commonly lifts the box out of its position of operation by inserting a tool under the terminals on the top of the box, and thereby frequently causes the cement to be broken.

The object of the present invention is to produce a battery box or the like and detachable handles therefor so constructed and arranged that when it is desired to remove the boxes from or replace them in their position of operation, the lifting and handling stresses will be communicated to the frame of the box in such a way that no stresses will be imposed upon the cement sealing the batteries, with the result that cement will not be cracked and broken and there will be no leakage of the acid from the boxes. The handles are not only made detachable so that they may be attached to or removed from the boxes when necessary, but they also may be left permanently attached to the boxes, when that is considered desirable, without interfering with a ready access to the devices and terminals on the top of the batteries. Although the invention is described as particularly adapted to battery boxes, it will be understood that it is equally applicable to use with other containers. To these ends the invention consists in the improved battery box or the like and the detachable handles therefor fully described hereinafter and particularly pointed out in the appended claims.

In the accompanying drawings illustrating the preferred form of the invention, Fig. 1 is a top plan view of a usual form of battery box or container, showing at one end a detachable handle, in plan, attached thereto, and at the other end the detachable handle and the adjacent part of the box in section; Fig. 2 is a side elevation of the top of one of the ends of the box, with the detachable handle in place thereon; Fig. 3 is a view similar to Fig. 2, with the handle removed; Fig. 4 is an enlarged sectional detail taken on the line 4—4 of Fig. 1; and Fig. 5 is a perspective view of a modified form of detachable handle.

The improved battery box and detachable handles therefor as illustrated in the drawings comprises a rectangular shaped receptacle, shown in plan in Fig. 1, provided with the side walls 7 and 8, and the end walls 9 and 10. The box is divided into three compartments 11 by the partitions 12. The box thus far described is of usual and well-known construction. The batteries are set into the compartments 11 and are sealed around the covers with a cement or other acid proof compound.

According to the present invention the lifting and handling stresses are imposed equally upon the corners of the boxes so that there will be no liability of distorting the side walls of the boxes while the rubber compound is softened by the heat generated by the operation of the batteries. By lifting and handling the box in this manner there is no liability of cracking and breaking the sealing compound, and consequently there will be no leakage of acid. Near the top of each outside corner of the box is formed a projection or lug 13 which is vertically arranged and is preferably in the form of a cylinder, although it will be obvious that other forms of projections may be used. The projections 13 on each end wall of the box may constitute a pair which are adapted to support and hold one handle.

The preferred form of handle, shown in side elevation in Fig. 2, is composed of sheet resilient metal and consists of a pair of gripping members 14 shaped to conform to the projections 13, as clearly indicated in the right hand sectional part of Fig.

1. The gripping members 14 are spaced apart correspondingly to each adjacent pair of projections 13 and are held in that relation by means of the plate-like midde part 15 of the handle. It will be observed by reference to Fig. 1 that in the lateral or outer sides of each pair of projections 13 the cylindrical part is carried inwardly beyond the transverse line joining the centers of the projections so as to provide in the side walls 7 and 8 of the box the holding notches or recesses 16 to accommodate the outer end 17 of the gripping members 14 of the handles. To provide for greater resiliency of the gripping members 14, the points at which they are connected with the middle part 15 of the handles are indented, as shown at 18. Rising upwardly from the middle part 15 of the handles is the handle proper 19 provided with a rolled top 20 and a recess 21 to accommodate the fingers of the workman. The handles are prevented against vertical displacement in either direction while on the box by means of the outwardly extending top and bottom sections 22 of the projections 13. The difference in the transverse diameter of the sections 22 and middle parts 13 of the projections is substantially equal to the thickness of the handles, as indicated in Fig. 2.

When the battery box or other receptacle provided with the detachable handles of the present invention is to be removed from or inserted into its operative position, the workman aligns the gripping members 14 of each handle with respect to the pair of projections 13 at each end of the box and by moving the handle inwardly toward the box snaps the gripping members over the projections 13. The cooperation between the projections 13 and the members 14 of the handles serves to hold the handles against accidental lateral displacement and the sections 22 of the projections 13 hold the handles against vertical displacement. The box may now be lifted, carried and otherwise handled without any liability of distorting the frame of the box and injuring the sealing compound. Since the lifting stresses are communicated to the strong corners of the boxes which are integral with the sides, the lifting stresses are distributed evenly and uniformly throughout the side and end walls. If the position and operation of the box permit, the handles may remain permanently attached to the box. If it is necessary or desirable to remove the handles, they may be readily detached from the box by inserting a flat tool under them near their ends and prying them off.

The modified form of handle shown in Fig. 5 is composed entirely of wire and has the general outlines of the preferred form of handle, so that it functions exactly the same. The gripping means or parts of the modified form of handle are indicated at 25 and the handle proper at 26. The whole handle is made of a single piece of wire and the abutting ends 27 are preferably brazed together.

Having thus described the invention what I claim as new is:—

1. A battery box and a detachable handle therefore comprising, a box-like structure having on one side a pair of vertically arranged rounded projections adapted to receive and hold gripping means, the top and bottom portions of the projections extending laterally beyond the middle sections thereof so as to prevent axial movement of the gripping means on the projections, and a handle consisting of two resilient, vertically arranged rounded gripping means spaced apart corresponding to the projections and adapted to be forced thereover so as to be held thereon by their resiliency and the lateral extension of the projections, and a handle part connected with the gripping means.

2. A battery box and detachable handles therefor comprising, a rectangular box-like structure having on each corner a vertically arranged projection adapted to receive and hold gripping means, the top and bottom portions of each projection extending laterally beyond the middle section thereof so as to prevent axial movement of the gripping means on the projection, and a handle for each end of the box consisting of two vertically arranged gripping means spaced apart corresponding to the projections on each end of the box and adapted to be forced thereover by lateral pressure and to be held on the projections by their resiliency and the lateral extensions of the projections, and a handle part connected with the gripping means.

EDWIN S. BOYER.